United States Patent [19]
Lambert

[11] 3,763,886
[45] Oct. 9, 1973

[54] ESTABLISHMENT IN A GROUP OF TUBULAR ELEMENTS OF VARIABLE FLOWS OF LIQUID FROM A COMMON SOURCE

[76] Inventor: Paul Lambert, 72 Cours de al Liberation, 38 Grenoble, France

[22] Filed: May 21, 1970

[21] Appl. No.: 39,234

[30] Foreign Application Priority Data
May 23, 1969 France .............................. 6916007
Feb. 20, 1970 France .............................. 7006260

[52] U.S. Cl. .................... 137/561, 176/43, 176/61
[51] Int. Cl. .............................................. G21c 7/32
[58] Field of Search ...................... 137/561, 561 A; 176/50, 56, 61, 43, 76, 78; 138/40, 42, 44, 46

[56] References Cited
UNITED STATES PATENTS

| | | | |
|---|---|---|---|
| 2,288,297 | 6/1942 | Naiman........................... | 137/561 A |
| 3,530,881 | 9/1970 | Tanner et al. ....................... | 137/561 |
| 2,400,161 | 5/1946 | Mockridge et al.................... | 138/42 |
| 3,167,305 | 1/1965 | Backx et al. ...................... | 138/42 X |
| 3,169,098 | 2/1965 | Leavitt............................ | 137/561 X |
| 3,510,396 | 5/1970 | Winkler et al. .................... | 176/56 X |

FOREIGN PATENTS OR APPLICATIONS
652,712 11/1962 Canada................................. 176/77
1,155,350 6/1969 Great Britain........................ 176/77

*Primary Examiner*—William R. Cline
*Attorney*—Sylvester J. Liddy, John J. Hart, Joe E. Daniels and Charles E. Baxley

[57] ABSTRACT

In a chemical installation having a group of tubular elements through which fluid from a common source circulates in varied flows in accordance with a given pattern, all of the tubular elements are mounted on identical feet that are each enclosed in a housing which is provided with a liquid inlet opening through which the liquid from the common source flows to the bottom entry end of the associated tubular element. Provided between the entry end of each tubular element and its associated liquid inlet opening is at least one annular constriction through which the liquid passes in its flow to such entry end. The different flows of liquid in the group of tubular elements are established by varying the number of the constrictions and/or their cross-sections, and/or the locations of the liquid inlet openings.

26 Claims, 6 Drawing Figures

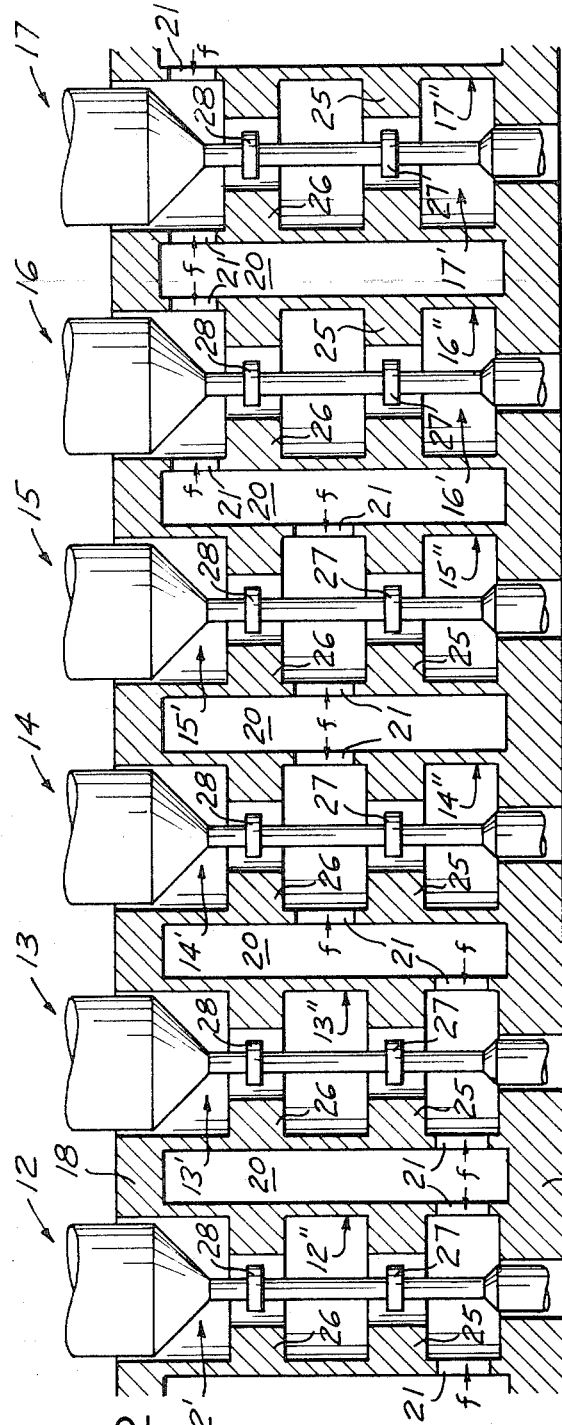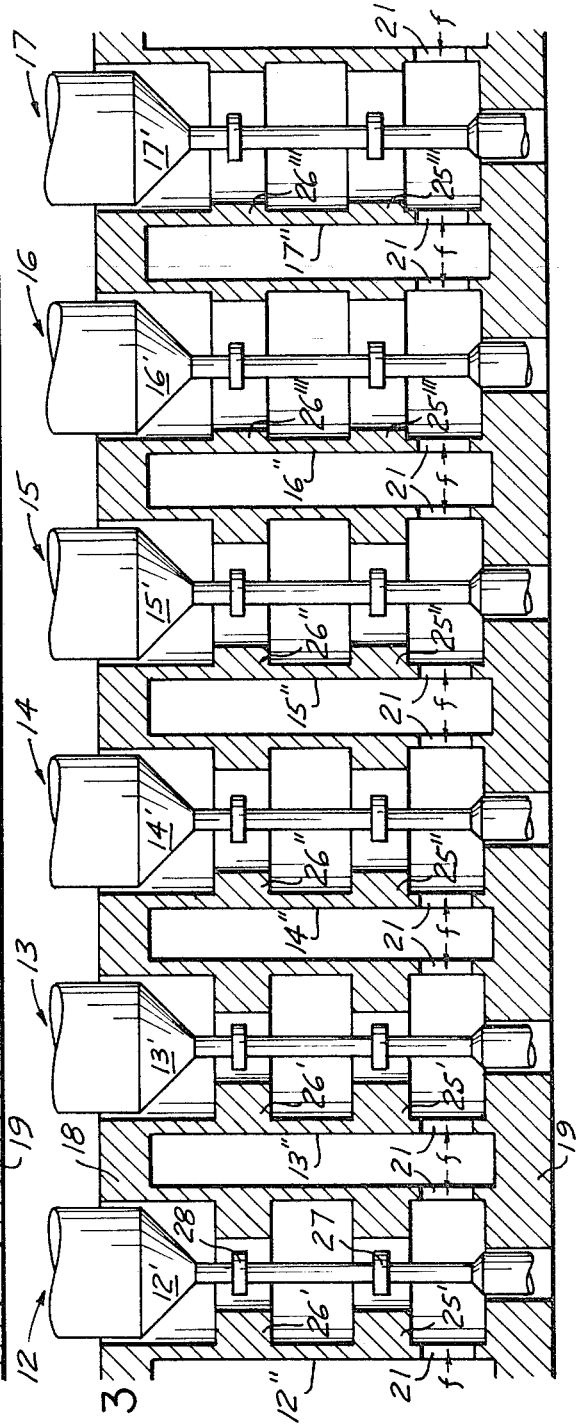
FIG. 2
FIG. 3
INVENTOR.
PAUL LAMBERT

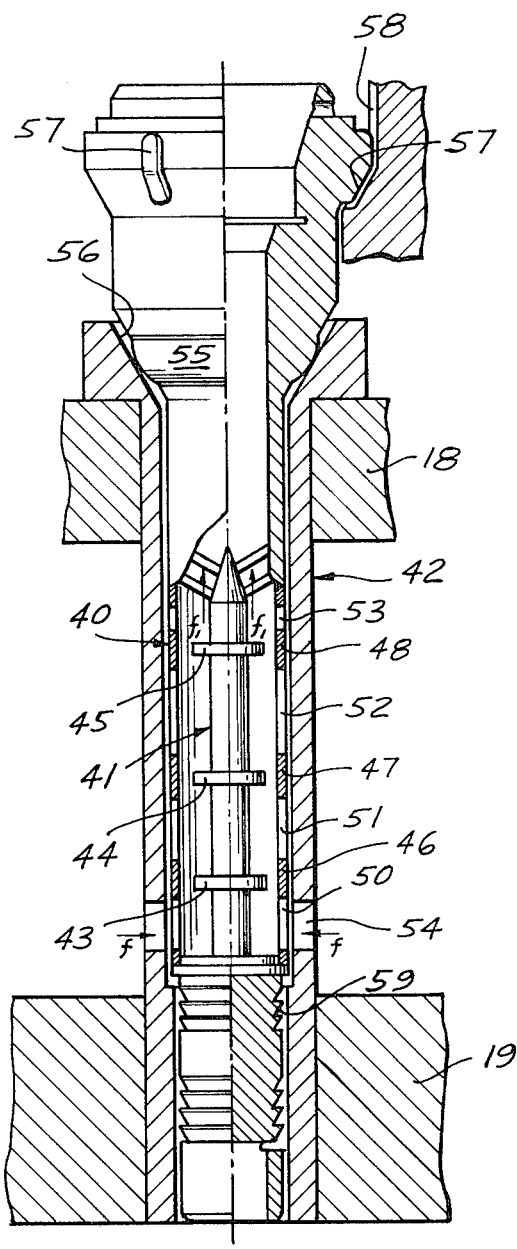
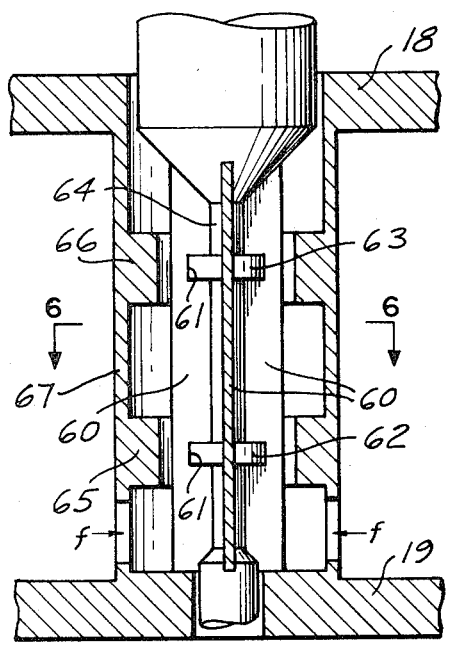
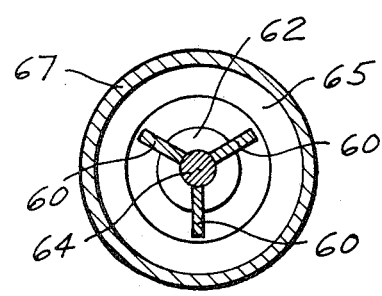

3,763,886

ESTABLISHMENT IN A GROUP OF TUBULAR ELEMENTS OF VARIABLE FLOWS OF LIQUID FROM A COMMON SOURCE

THE INVENTION

The invention relates to the flows of fluid in a plurality of tubular elements such as are provided in certain types of nuclear reactors and in certain chemical installations, wherein for example, the tubular elements are under luminous flux and the rate of flow therein is different, depending on their positions with respect to the sources of light, and has for its principal purpose the provision of improved means for establishing variable flows in such elements of fluid fed thereto from a common source.

In some chemical installations, particularly in certain types of nuclear reactors, it is necessary to establish fluid circulations in a large number of interchangeable tubular elements grouped on a support and fed with fluid at their base from a common source; the rate of flow of this fluid differing for each element in accordance with its position on the support. This result has heretofore been usually obtained by varying the cross-sectional areas of the fluid inlet orifices so as to effect the desired distribution of the heat-transfer fluid over the fuel elements so that the rate of flow thereover decreases from the center of the group of fuel elements towards the edges of such group. Such an arrangement however, has the drawback of frequently giving rise to cavitation in the case of those tubular elements having low rates of flow due to the strong pressure drop imposed upon the flow thereinto as the fluid passes through the inlet orifices thereof.

In accordance with this invention the aforesaid disadvantage is overcome by providing at least one constriction in an annular space along the entry end portion of each tubular element, the cross-sections of such constriction and/or the locations of the fluid inlet openings or orifices in such entry end portions being variable to effect the desired variation in the flows through the tubular elements.

For a better understanding of the invention, as well as the advantages and features thereof, reference is made to the following description and to the accompanying drawings which show several embodiments thereof in a nuclear reactor by way of illustration and in which:

FIG. 2 is a schematic view partly in axial vertical section, of a portion of a nuclear reactor and showing several fuel assemblies in their housings;

FIG. 3 is a view similar to FIG. 2 of a modified form of nuclear reactor;

FIG. 4 is a vertical view, partly in axial section, showing the foot of a fuel assembly and its housing embodying the invention and provided with a protective jacket;

FIG. 5 is a vertical view, partly in axial vertical section, of the foot of a fuel assembly and its housing and showing a modified form of protective means, and FIG. 6 is a horizontal sectional view taken along the line 6—6 of FIG. 5.

Figure 1:
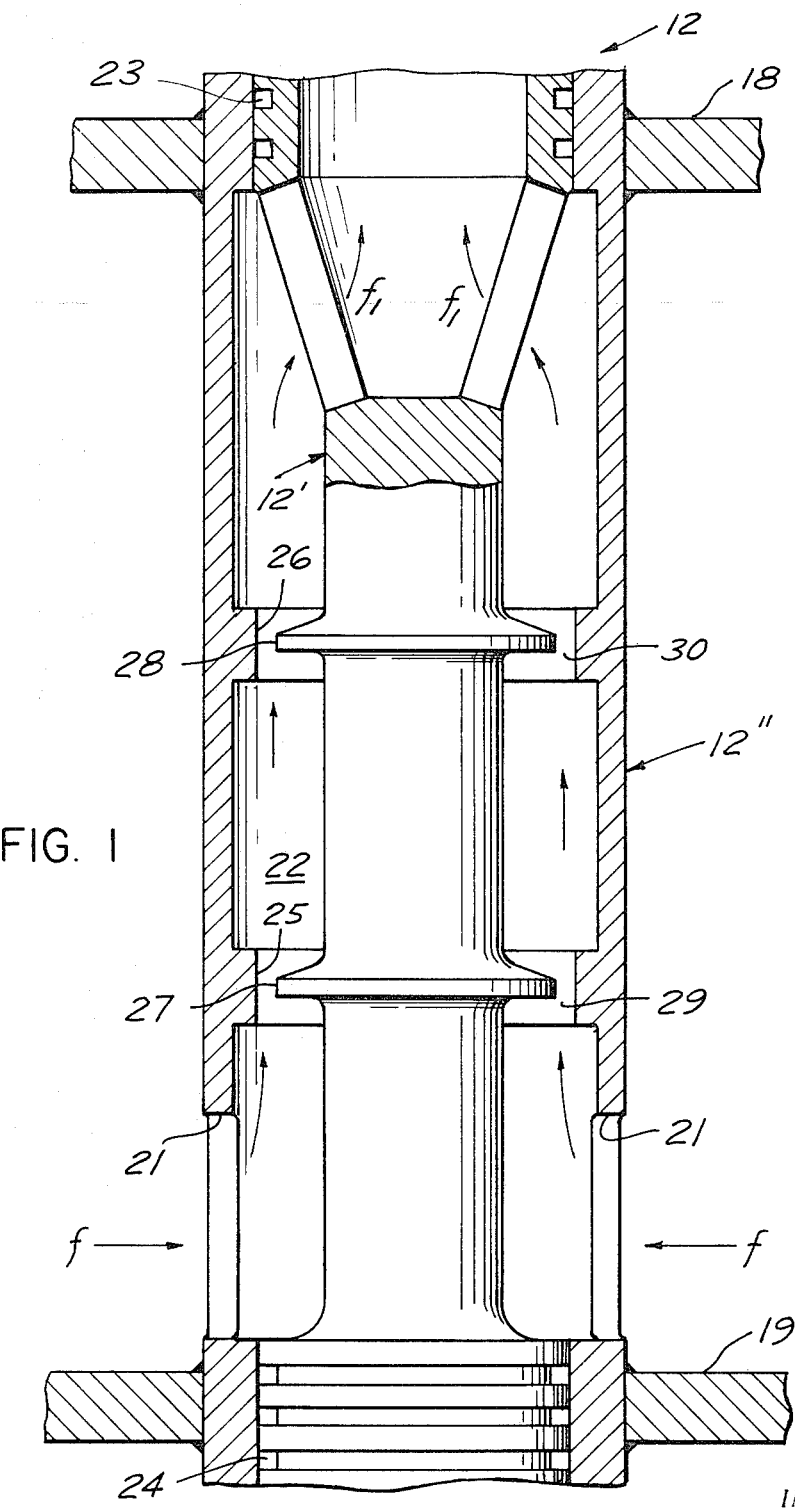
FIG. 1 is a vertical view partly in axial vertical section, of the foot of a fuel assembly and its housing.

In FIG. 1 of the drawings, the reference numeral 12' indicates generally the foot of a fuel assembly 12 in a nuclear reactor. The foot 12' is enclosed in a cylindrical housing 12" which forms part of a support for the fuel assembly. As is shown in FIG. 2 of the drawings, the fuel assembly 12 forms one of a plurality of fuel assemblies in the nuclear reactor, and each of such assemblies is provided with a foot and an associated housing. The fuel assemblies shown in FIG. 2 are generally designated 12, 13, 14, 15, 16 and 17, and the feet associated with such assemblies are generally designated 12', 13', 14', 15', 16' and 17', respectively. The housings enclosing the feet of the fuel assemblies shown in FIG. 2 are designated generally by the numerals 12", 13", 14", 15", 16" and 17", respectively. The housings form part of the support in the reactor for the fuel assemblies, and such support includes top and bottom walls 18 and 19, respectively, which together with the housings form passages 20 to which the heat-transfer fluid is supplied from a common source in a known manner and through which passages such fluid circulates to the inlet orifices in the housings. There are two inlet openings provided in each housing and such openings or orifices are designated by the numeral 21.

Referring now more particularly to FIG. 1 of the drawings, the fluid entering the orifices 21,21 of the housing 12" passes up through an annular passage 22 formed between the foot 12' and the housing 12" as indicated by the arrows f. After rising in the passage 22, the fluid passes into the fuel assembly 12 as indicated by the arrows f1. Labyrinth joints 23,24 provide seals between the foot 12' and the housing 12" at their upper and lower ends, respectively. In its flow through the annular passage 22, the fluid passes through two diaphragms or constrictions which cause two successive pressure drops to give to the fluid the rate of flow desired for the fuel assembly 12 in the particular location in which it is positioned in the reactor. The two constrictions are formed between two spaced, identical, internal collars 25, 26 provided on the housing 12" and two spaced, identical, external collars 27,28 provided on the foot 12', the collars 25,27 forming the annular constriction 29 and the collars 26,28 forming the constriction 30. It will be noted in FIG. 2 of the drawings, that all of the feet 12', 13', etc. of the fuel assemblies are identical in construction and have similar external collars 27,28. It is thus possible to interchange the fuel elements in the reactor as desired. Usually such shifting of the fuel assemblies is dependent on their degree of depletion, and since they are identical this can be done without changing the required distribution of the rate of flow over the area of the reactor occupied by such fuel assemblies, namely, an increase from the periphery of the reactor, toward the center thereof.

As the internal collars 25,26 on the housings 12",13", etc. in the embodiment of FIG. 2 are also identical in construction so that the annular constrictions 29,30 throughout the reactor are similar to provide similar pressure drops, the desired distribution of the rate of flow of the heat-transfer fluid in such reactor is accomplished by varying the location of the inlet orifices in the housings. Thus, it will be noted that in the reactor shown in FIG. 2, the housings 12" and 13" forming part of the periphery of the support for the fuel assemblies have their orifices 21 provided at the bases thereof. Thus, the heat-transfer liquid passes through both of the constrictions 29 and 30 associated with the two fuel assemblies 12,13, so that before the entry of such fluid into such assemblies it undergoes two successive pressure drops, which gives a minimum value to the rate of flow of such fluid in such assemblies.

The fluid entry orifices 21 for the fuel assemblies 14,15 which are located in the central portion of the reactor are located between the internal collars 25, 26 on their associated housings 14″ and 15″. Thus, the heat-transfer fluid in its flow to such fuel assemblies will pass through only one diaphragm, i.e., the diaphragm 26–28 forming the annular constriction 30. The fluid, therefore, will undergo only one pressure drop which assures that in the fuel assemblies 14, 15, it will have a rate of flow greater than that which is provided in the peripheral fuel assemblies 12 and 13.

The fuel assemblies 16 and 17 are located in the central portion of their support and therefore should be provided with the greatest rate of flow. This is accomplished by providing the inlet orifices 21 for such assemblies above the collars 26 of their associated housings 16″ and 17″ so that the heat-transfer fluid does not pass through any diaphragm in its passage to such assemblies. Since the fluid does not suffer any substantial drop in pressure in the entry end portions of such assemblies, it has a rate of flow of maximum value.

Instead of providing the desired distribution of rate of flow by suitably locating the entry orifices 21 with relation to the collars 25,26 in the housings 12′′′, 13′′′ etc., such flow distribution can also be accomplished in accordance with the invention, by providing the housings with diaphragms of different cross-sections in accordance with their location in the support. This method of effecting the desired distribution is illustrated in FIG. 3 of the drawings. It will be noted that in the embodiment of FIG. 3, as in the embodiment of FIG. 2, the fuel assemblies 12, 13, etc., and their associated feet 12′, 13′ etc., are identical in construction to permit the fuel assemblies to be changed from one housing to another without changing the distribution of the flows through such housings depending on their location in the support. It will be noted also, that the inlet orifices 21 for all housings in the embodiment of FIG. 3 are at the base or bottom thereof so that the fluid entering each housing will undergo two successive pressure drops before it enters the fuel assemblies.

The peripheral housings 12″ and 13″ have large internal collars or flanges 25′ and 26′ forming with the collars 27 and 28 of the feet 12′ and 13′, diaphragms which create a large pressure drop so that the flow of the heat-transfer fluid into the fuel assemblies 12 and 13 is greatly reduced. The housings 14″ and 15″ located in the central part of the support have smaller collars 25″, 26″ so that the diaphragms they form with the associated foot collars 27 and 28 causes a smaller pressure drop in the flow of the heat-transfer liquid which accordingly is at a higher rate. The internal collars 25′′′, 26′′′ in the housings 16″, 17″ are still smaller than those previously mentioned so that they cooperate with their associated foot collars 27,28 to create a very small pressure drop and thereby cause the rate of flow of the heat-transfer fluid to be very great.

One can of course combine the aforesaid feature of the embodiment of FIG. 3 with a variation in the positions of the inlet orifices as in the embodiment of FIG. 2 to effect any desired variations in the rates of flow of the heat-transfer fluid throughout the area of the nuclear reactor. Further, modification in the rates of flow of such fluid in all of the fuel assemblies can be made by replacing the feet 12′,13′ etc., by others which are also identical to each other, but which have external collars of different areas than the collars 27 and 28 in the embodiments of FIGS. 2 and 3.

It will be understood from the foregoing, that in the practice of the invention the external collar or collars on each foot of the fuel assemblies (the tubular elements) may be identical or different, but all of the feet of all of the tubular elements are identical to each other. Further, the internal collar or collars in each housing may be identical, or different, and the internal collar or collars from one housing to the other may be identical, or different. The inlets for the heat-transfer fluid may be in the same or different positions in the housings and may be of the same or of different dimensions from one housing to the other. It will thus be seen, that the desired adjustment of the flow through the fuel assemblies of a reactor can be obtained by (a) modifying the positions of the fluid inlets, thus having the effect of placing a different number of diaphragms in circuit from one housing to another, (b) by modifying the dimensions of the fluid inlets in the housings, (c) by changing the dimensions of the collars on the feet, (d) by changing the dimensions of the collars in the different housings, and (e) by utilizing two or more of such factors to effect a combination thereof.

It will be understood also from the foregoing, that whatever dimension or dimensions of the collar or collars that are selected for the feet of the fuel assemblies, the construction of all of the feet is identical so that the fuel assemblies may be interchangeable from one housing to another without the distribution of the flow of fluid in the reactor as a whole being changed thereby. It has been found that in making such changes, the external collar or collars on the foot of a fuel assembly being changed could become caught on rough places in the housing into which it was being inserted, thereby greatly complicating the positioning of the foot within such housing and risking of the collars as this operation was being done. In order to avoid this disadvantage, the present invention also contemplates providing protective means to facilitate such insertion of the foot of the tubular element into the housing. Broadly speaking, such protective means should have radial dimensions greater than that of the collar or collars of the foot, but less than the internal diameter of the collar or collars in the housing, and should extend over the entire length of the foot and fit into the housing. Preferably, means should be associated with such protective means to assure precise vertical and horizontal positioning of the foot in the housing.

As is shown in FIG. 4 of the drawings such protective means may take the form of a cylindrical jacket 40 which surrounds the portion of the foot 41 of a fuel assembly of a nuclear reactor located between the top wall 18 and the bottom 19 of the fuel assembly support of which the housing 42 forms a part. The foot illustrated is provided with three identical collars 43,44 and 45 which are enclosed by the cylindrical jacket 40. It will be noted that the housing 42 in this embodiment is devoid of internal collars, and that the diaphragms are formed by the foot collars 43, 44 and 45 and the inner annular surface portions 46, 47 and 48, respectively, of the jacket 40 which are in opposed relation to such foot collars. The jacket 40 has four lateral rows or series of orifices 50, 51, 52 and 53 located on the jacket so that at least one of such rows will always be positioned opposite a lateral row of fluid entry orifices 54 in the housing 42, whatever the position of such entry orifices 54 on the housing. The number and position of the orifices in each of the rows 50, 51, 52 and 53 are such that they can be brought into registry with the entry orifices 54 provided in the housing. To effect such registration, the foot 41 is provided with means to effect a precise positioning of the same in the housing 42 in both vertical and horizontal directions. Thus, the foot 41 is provided at its upper end with an annular convex section 55 which engages with an inclined seat 56 at the upper end of the housing 42 to effect a proper positioning of the foot 41 with respect to the housing 42 in the vertical direction. The foot 41 is also provided at its upper end with outwardly projecting lugs or spurs 57 which engage with vertically disposed recessed seats 58 provided in its holding clamp to assure the proper horizontal positioning of the foot in the housing 42.

The diameter of the jacket 40 is such that it fits in the housing 42 with a slight amount of play. This slight play, which is necessary to permit ready insertion of the jacket into the housing, does not cause any substantial parasitic flows. However, it is taken into account in the calculation of the diaphragms. The fluid-tight sealing of the foot 40 in the housing 42 is effected at the upper end of such members by the joint formed between the convex section 55 an such foot and the conical seat 56 provided on the housing 42. The lower ends of such members are formed to provide a tight joint 59 therebetween.

It will be understood that as in the embodiment of FIG. 2, the orifices 54 of the housing can be placed either at its base, as is indicated in FIG. 4, or between the collars 43 and 44, or between the collars 44 and 45, or above the collar 45. When the entry orifices 54 are provided in the base of the housing as shown in FIG. 4, the heat-transfer fluid entering through the orifices 54 from the common source, as indicated by the arrow f, passes through the registering jacket orifices 50 and up through the annular channel formed between the foot 41 and the jacket 40 and into the fuel assembly as indicated by the arrows f1. During such passage, the fluid flows through the diaphragms 43–46, 44–47 and 45–48 and experiences a pressure drop which controls its rate of flow through the fuel assembly. In the event that the entry orifices 54 of the housing 42 are arranged between the collars 43 and 44, the heat-transfer fluid would penetrate through such orifices and the orifices 51 of the jacket registered therewith and then pass through the diaphragms 44–47 and 45–58 which would adjust the rate of flow thereof to a new value.

In those cases in which the housing orifices 54 are arranged between the collars 44 and 45, or above the collar 45, the flow of the heat-transfer fluid would take place, respectively, through the jacket orifices 52 or 53, and pass, respectively, through the diaphragm 45–48, or directly into the fuel assembly, at still different rates of flow.

In FIGS. 5 and 6 of the drawings, the protective means is shown as being composed of three radial walls 60 which extend over the entire length of the portion of the foot between the top wall 18 and the bottom wall 19 of the fuel assembly support. The protective radial walls 60 are provided with slots 61 to receive the foot collars 62, 63 and extend radially from the periphery of the foot 64 a greater distance than the collars 62, 63. The radial extension of the walls 60 is less than one-half the internal diameter of the collars 65, 66 on the housing 67 so that the foot and radial wall assembly may be readily inserted into such housing. It is believed apparent the manner in which the radial walls 60 will afford protection to the foot and associated collars during such insertion.

What is claimed is:

1. The combination of a plurality of tubular elements each having a foot extending axially from its entry end, the feet of all of said tubular elements being identical, a support for said tubular elements comprising a housing for each of said tubular elements and said support being constructed and arranged to form passages for conducting fluid from a common source to each of said housings, each of said housings enclosing a foot of a tubular element and forming with the latter an annular passageway to the entry end of such tubular element, and said housings having fluid inlet orifices bringing said support fluid passages into communication with said annular passageways, and means in certain of said annular passageways between associated inlet orifices and tubular element entry ends for producing pressure drops in the fluid flows through said annular passageways to control the rate of flow of the fluid entering said tubular elements, said pressure drop means varying in construction to produce variable flows of fluid through the tubular elements in accordance with a given pattern.

2. The combination defined in claim 1, in which said tubular elements are interchangeably arranged on said support, and in which the constructions of said pressure drop means vary in accordance with the positions of said housings on said support and are such that an interchange of the tubular elements may be made without disturbing said given pattern of variable fluid flow.

3. The combination defined in claim 1, in which said pressure drop means in an annular passageway is constituted of at least one constriction therein, the cross-sections of the constrictions being variable to effect said given rate of flow pattern.

4. The combination defined in claim 1, in which said pressure drop means in an annular passageway is constituted of at least one constriction therein, and in which the constrictions are formed between the peripheral surfaces of external collars provided on the feet of the tubular elements and annular surface portions disposed in opposed spaced relation to said peripheral surfaces.

5. The combination defined in claim 4, in which said housings are provided with external collars disposed in opposed relation to the external collars provided on the feet of the tubular elements, said annular surface portions forming the peripheral surfaces of said external collars.

6. The combination defined in claim 5, in which said feet of all of said tubular elements are identical and have identical collars, and in which the collars on said housings are identical on one and the same housing and from one housing to the other, the inlet orifices for the heat-transfer fluid in said housings changing in altitude to place in the circuit a different number of constrictions for each housing or each group of housings.

7. The combination defined in claim 5, in which said feet of all of said tubular elements are identical and have identical collars, and in which the collars on said housings are identical on one and the same housing and variable from one housing to the other, the inlet orifices in said housings for the heat-transfer fluid being identical in all the housings and located below the lower constriction.

8. The combination defined in claim 5, in which said feet of all of said tubular elements are identical and have identical collars and in which the collars on said housings are identical on one and the same housing and variable from one housing to the other, the inlet orifices in said housings for the heat-transfer fluid changing in altitude to place into the circuit a different number of constrictions for each housing or each group of housings.

9. The combination defined in claim 5, in which said feet of all of said tubular elements are identical and have identical collars, and in which the collars on said housings are different on one and the same housing and identical from one housing to the other, the inlet orifices in said housings for the heat-transfer fluid changing in altitude from one housing to the other or from one group of housings to the other.

10. The combination defined in claim 5, in which said feet of all of said tubular elements are identical and have identical collars, and in which the collars on said housings are different on one and the same housing and from one housing to the other, the inlet orifices in said housings for the heat-transfer fluid being identical in all the housings and located below the lower constrictions.

11. The combination defined in claim 5, in which said feet of all of said tubular elements are identical and have identical collars, and in which the collars on said housings are different on one and the same housing and from one housing to the other, the inlet orifices in said housings for the heat-transfer fluid changing in altitude from one housing to the other or from one group of housings to the other.

12. The combination defined in claim 5, in which said collars on each foot of said tubular elements are different and all of said feet are identical, and in which the collars on said housings are identical on one and the same housing and from one housing to the other, the inlet orifices in said housings for the heat-transfer fluid changing in altitude to place into the circuit a different number of constrictions for each housing or each group of housings.

13. The combination defined in claim 5, in which said collars on each foot of said tubular elements are different and all of said feet are identical, and in which the collars on said housings are identical on one and the same housing and different from one housing to the other, the inlet orifices in said housings for the heat-transfer fluid being identical on all the housings and located below the lower diaphragm.

14. The combination defined in claim 5, in which said collars on each foot of said tubular elements are different and all of said feet are identical, and in which the collars on said housings are identical on one and the same housing and different from one housing to the other, the inlet orifices in said housings for the heat-transfer fluid changing in altitude from one housing to the other or from one group of housings to the other.

15. The combination defined in claim 5, in which said collars on each foot of said tubular elements are different and all of said feet are identical, and in which the collars on said housings are different on one and the same housing and identical from one housing to the other, the inlet orifices in said housings for the heat-transfer fluid changing in altitude from one housing to the other or from one group of housings to the other.

16. The combination defined in claim 5, in which said collars on each foot of said tubular elements are different and all of said feet are identical, and in which the collars on said housings are different on one and the same housing and from one housing to the other, the inlet orifices in said housings for the heat-transfer fluid being identical on all the housings and located below the lower constriction.

17. The combination defined in claim 5, in which said collars on each foot of said tubular elements are different and all of said feet are identical, and in which the collars on said housings are different on one and the same housing and from one housing to the other, the inlet orifices in said housings for the heat-transfer fluid changing in altitude from one housing to the other or from one group of housings to the other.

18. The combination defined in claim 4, including sheathing elements connected to the feet of the tubular elements and enclosing the same, said enclosing sheathing elements being spaced from the peripheral surfaces of the external collars provided on the feet of the tubular elements and inner surface portions thereof disposed in opposed relation to the peripheral surfaces of said external collars constituting said annular surface portions forming the constrictions.

19. The combination defined in claim 4, in which said feet on all of said tubular elements are identical so that said tubular elements may be interchangeably arranged on said support, and including protective means mounted on each foot and providing smooth protective surface portions extending throughout the length of the portion of the foot contained in its associated housing and located between the peripheral surfaces of said external foot collars and the interior of such housing to permit of such interchange while affording protection to said collars during the same.

20. The combination defined in claim 19, including means connected to said foot and to said housing and coactable to assure precise vertical and horizontal positioning of the foot and its associated protective means in the housing.

21. The combination defined in claim 19, in which said protective means includes annular horizontal portions associated in spaced relation to the external collars on said foot, the inner surfaces of such annular portions constituting said annular surface portions forming the constrictions.

22. The combination defined in claim 21, in which said protective means is provided between each of said annular horizontal portions thereof with openings in such number and position that certain thereof will register with the fluid inlet orifices of the housing whatever the position of the latter in the housing.

23. The combination defined in claim 19, in which the protective means on the foot of the tubular element is formed of a cylindrical jacket which surrounds it, the assembly being adapted to be inserted into any one of the foot housings, said jacket having inner surface portions disposed in opposed relation to the peripheral surfaces of said external foot collars and constituting said annular surface portions forming the constrictions, said jacket having lateral orifices in such number and position that given orifices are always opposite the fluid inlet orifices of the housing in which it is inserted, whatever the position of the said orifices in that housing.

24. The combination in claim 19, in which the protective means on the foot of the tubular element is formed of at least three radial walls extending over the entire length of the foot, each of said walls being of a radius greater than that of the collars, but less than one half of the interior diameter of the housing.

25. The combination defined in claim 1, in which said pressure drop means in an annular passageway is constituted of at least one constriction therein, the locations of the fluid inlet orifices of the housings being variable to effect said given rate of flow pattern.

26. The combination defined in claim 1, in which said pressure drop means in an annular passageway is constituted of at least one constriction therein, both the cross-sections of the constrictions and the locations of the fluid inlet orifices of the housings being variable to effect said given rate of flow pattern.

* * * * *